United States Patent Office 3,442,999
Patented May 6, 1969

3,442,999
PROCESS FOR THE PRODUCTION
OF CHIPBOARDS
Hans-Joachim König, Wolfgang Bodenstedt, and Ulrich Gotsmann, Frankfurt am Main, Germany, assignors to Cassella Farbwerke Mainkur Aktiengesellschaft, Frankfurt am Main-Fechenheim, Germany, a company of Germany
No Drawing. Filed July 19, 1966, Ser. No. 566,195
Claims priority, application Germany, Aug. 3, 1965, C 36,561
Int. Cl. B29j 5/00
U.S. Cl. 264—128                      2 Claims

ABSTRACT OF THE DISCLOSURE

Chipboard production by separately spraying wood chips with an aqueous dispersion of melamine and an aqueous formaldehyde solution and consolidating said sprayed chips under heat and pressure.

---

Chipboards are generally produced by glueing chips with a solution of urea-formaldehyde resins and subsequently pressing the chip cake on heated multi-platen presses. Glueing is made by spraying the resin solution with the aid of nozzles onto the wood chips kept in motion. The resins employed are supplied in the form of solutions or powders. The solutions are required to be stable for several months.

Chipboards produced by utilization of urea-formaldehyde resins exhibit only a comparatively small resistance to water. Therefore, they should only be employed within close, dry rooms (manufacture of furniture, inner walls etc.).

More recently, efforts have been made to produce chip boards as weather- and moisture-resistant as possible, such as are obtained by glueing with melamine-formaldehyde resins. However, said resins have the disadvantage that they yield solutions being stable for a limited period of time only. It is, therefore, in most cases necessary to supply the melamine resin in the form of a powder and to dissolve it prior to use in suitable dissolving devices. In general, the stability of the solutions thus obtained decreases proportionately to the increasing concentration. On the other hand, solutions of about 60% are required to achieve a sufficient glueing of the chip boards.

We, now, have surprisingly found that good chip boards can easily be obtained by separately spraying onto the wood chips melamine in the form of an aqueous dispersion and an aqueous formaldehyde solution and heat-pressing in the usual manner the chip cakes formed from the chips thus pretreated. The formaldehyde being highly volatile in itself reacts, contrary to expectation, with the melamine so rapidly that the condensation to give a melamine-formaldehyde resin and the glueing on the heated multi-platen press are effected in a single step without any substantial loss of formaldehyde and any prolongation of the pressing time.

During the spraying operation, other conventional additives may be used, such as, for example, paraffin emulsions and hardeners.

The chipboards preparable under the present invention distinguish themselves by a very good resistance to weather and moisture.

The following examples are given for the purpose of illustrating the present invention. Unless otherwise stated, all temperatures given are in degrees centigrade.

EXAMPLE 1

205 g. of an aqueous dispersion containing 30.8% of melamine and being prepared with the sodium salt of the ligninsulfonic acid acting as a dispersing agent, and 98 g. of a 39% aqueous formaldehyde solution are sprayed onto 1012 g. woods chips. The total amount of melamine and formaldehyde is 10% of the weight of the chips. The chip cake is subsequently pressed for 15 minutes at 170°, on a multi-platen press equipped with a steel frame.

Density of chipboard _____kg./m.³__ 642
Flexural strength _____kg./cm.²__ 62

The board is, unlike one prepared by utilization of urea-formaldehyde resin, not destroyed by boiling water.

EXAMPLE 2

197 g. of an aqueous dispersion containing 32% of melamine and being prepared with the sodium salt of the dinaphthylmethanedisulfonic acid acting as a dispersing agent, and 115 g. of a 39% formaldehyde solution are sprayed onto such an amount of wood chips that the total amount of melamine and formaldehyde is 10% of the weight of the chips. The pressing conditions are the same as those specified in Example 1.

Density of chipboard _____kg./m.³__ 628
Flexural strength _____kg./cm.²__ 136

EXAMPLE 3

195 g. of an aqueous dispersion containing 32.3% of melamine and 0.28% of tylose, which dispersion was prepared with the sodium salt of the dinaphthylmethanedisulfonic acid, and 134.6 g. of a 39% formaldehyde solution are sprayed onto such an amount of wood chips that the total weight of melamine and formaldehyde is 10% of the weight of the chips. The pressing conditions are the same as those described in Example 1.

Density of chipboard _____ kg./m.³__ 712
Flexural strength _____kg./cm.²__ 151.4

EXAMPLE 4

175 g. of a melamine dispersion having a melamine content of 35.7%, which was prepared with an addition product of ethylene oxide to fatty alcohols acting as a dispersing agent, together with 154 g. of a 39% formaldehyde solution are sprayed onto wood chips in the same quantity ratio as described in Examples 1–3 and then pressed as indicated therein.

Density of chipboard _____kg./m.³__ 692
Flexural strength _____kg./cm.²__ 91.4

We claim:
1. A process for producing chipboard which comprises separately spraying wood chips with an aqueous dispersion of melamine and an aqueous formaldehyde solution and consolidating the thusly sprayed wood chips under heat and pressure to produce said chipboard.
2. The process of claim 1 wherein said aqueous melamine dispersion contains, as dispersing agent, a member selected from the group consisting of the sodium salt of dinaphthylmethanedisulfonic acid and an ethylene oxide-fatty acid addition product.

References Cited

UNITED STATES PATENTS

| | | | |
|---|---|---|---|
| 1,970,578 | 8/1934 | Schoeller et al. | 260—458 |
| 2,876,153 | 3/1959 | Dorland et al. | 264—109 |
| 2,953,534 | 9/1960 | Schneider | 260—17.3 |

DONALD J. ARNOLD, Primary Examiner.

J. R. HALL, Assistant Examiner.

U.S. Cl. X.R.

264—109